US006810302B2

United States Patent
Darcy, Jr. et al.

(10) Patent No.: US 6,810,302 B2
(45) Date of Patent: Oct. 26, 2004

(54) PROCESS AND METHODOLOGY FOR SELECTING CUTTING PARAMETERS FOR TITANIUM

(75) Inventors: Paul Darcy, Jr., Hamden, CT (US); William C. Harris, Derby, CT (US); Michael S. Torok, Cheshire, CT (US); Tahany El-Wardany, Hartford, CT (US); Peter Fitzpatrick, Chatham, MA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 13 days.

(21) Appl. No.: 10/404,179

(22) Filed: Mar. 31, 2003

(65) Prior Publication Data
US 2004/0193308 A1 Sep. 30, 2004

(51) Int. Cl.[7] ............................................. G06F 19/00
(52) U.S. Cl. ............................ 700/182; 703/2; 700/280
(58) Field of Search ................................. 700/182, 177, 700/280, 173–175; 703/2, 6; 408/143; 409/141; 340/683; 73/579; 702/56

(56) References Cited

U.S. PATENT DOCUMENTS

| | | | | |
|---|---|---|---|---|
| 4,559,600 A | * | 12/1985 | Rao | ............................ 700/175 |
| 5,518,347 A | * | 5/1996 | Cobb, Jr. | ..................... 409/141 |
| 5,700,116 A | * | 12/1997 | Cobb, Jr. | ..................... 409/141 |
| 6,085,121 A | * | 7/2000 | Stern | .......................... 700/175 |

* cited by examiner

Primary Examiner—Leo Picard
Assistant Examiner—Steven R. Garland
(74) Attorney, Agent, or Firm—Bachman & LaPointe, P.C.

(57) ABSTRACT

A method of predicting the cutting speed for machining of titanium alloy comprising the steps of obtaining a first transfer function for a tool system, obtaining a second transfer function for a workpiece system, selecting from the first transfer function a first flexible mode, selecting from the second transfer function a second flexible mode, defining a natural frequency of the first flexible mode and the second flexible mode, calculating a tooth passing frequency using the defined natural frequency, accepting the calculated tooth passing frequency if the calculated tooth passing frequency differs from a second harmonic of a combined system formed of the tool system and the workpiece system and from at least one natural frequency corresponding to the tool system and the workpiece system, calculating a stable spindle speed, defining a cut depth using the calculated spindle speed.

9 Claims, 5 Drawing Sheets

PROCESS AND METHODOLOGY FOR SELECTING CUTTING PARAMETERS FOR TITANIUM

BACKGROUND OF THE INVENTION (1) Field of the Invention

The present invention relates to a method for the systematic prediction of stable high speed cutting parameters for machining titanium.

(2) Description of Related Art

Titanium alloys are used extensively in manufacturing helicopter components because of their excellent combination of high specific strength, which is maintained at elevated temperature, high resistance to corrosion, fracture resistance characteristics and extensive ductility, especially at high strain rates. Despite the excellent properties of titanium alloys, their machinability is generally considered poor due to the following inherent properties. First, the high strength maintained at elevated temperatures with a low modulus of elasticity impairs the machinability of titanium. Second, large amounts of heat are generated at the tool/workpiece interface adversely affecting the tool life because titanium alloys have thermal conductivity 13 times less than aluminum.

Third, machining of titanium produces typically shear-banded (segmented) chips due to poor thermal properties. These chips cause a sudden force fluctuation from a peak value to a minimum value. The rapid force fluctuation causes a hammering on the tool face at the tool tip in the vicinity of cutting. This phenomenon accelerates the tool chipping process as the cutting speed increases and reduces tool life to a fraction of a second.

Fourth, the segmented chips roll onto the tool face and have a short time of non-sliding contact. During machining the low thermal conductivity and high strength of titanium, alloys create high temperatures leading to high rates of tool wear.

Lastly, titanium is very chemically reactive, and has the tendency to weld to the cutting tool during machining, which leads to chipping and premature failure.

An existing method for controlling the tool chip interfacial temperature consists of a high-pressure coolant jet applied at the tool-chip interface. The high-pressure coolant is delivered through internal coolant passages and an array of discrete nozzles that eject the coolant onto the cutting edge at a predetermined mass flow rate and impingement pressure.

Yet another method for controlling the tool chip interfacial temperature consists of a high-pressure coolant jet applied at the tool-chip interface. A thermal-mechanical High Speed Machining (HSM) model is used to predict the interfacial temperature as a function of cutting speed, coolant flow rate, and coolant application angle. Based on the predicted temperature, the optimal integral nozzle configuration is designed. The nozzle shape is optimized through a definite element model for predicting interfacial temperature isotherms with the objective of minimizing their values.

Model predictions and experimental results show that the shaped nozzle creates a correspondingly shaped jet, which is more effective at removing heat from the tool-chip interface, thereby reducing the tool chip interface temperature. Although the high-pressure coolant applications evacuate the chips very efficiently and reduce the tool temperature, which allows the increase in the cutting speed and consequently the feed rate 10 times, tool life is very low. The main mechanism of tool failure is chipping. The fluctuation of the cutting forces due to chip segmentations is one of the main reasons for this chipping. High rigidity of machine tool, use of high feed, and low rake angle can mitigate tool chipping. The segment spacing of the chip is equal to the feed (or uncut chip thickness) and is governed by the rake angle. Increasing the segment spacing reduces the frequency of impact and increases the area of contact so that the forces will be less concentrated on the tool tip.

This solution cannot be generalized for any tool/workpiece/fixture system. In many applications the feed is constrained due to workpiece flexibility, which can cause chatter. Also, in an operation such as face milling, the flexibility of the workpiece fixture does not allow for high feed as the cutting speed increases.

High speed milling of titanium is limited because of the dynamic behavior of the tool/workpiece/fixture system and the loads on the tools. Vibration can occur if the tooth passing frequency (No. of flutes or inserts *spindle speed–rpm/60) matches the frequency of anyone component of the tool/workpiece/fixture system. This type of vibration is usually referred to as forced vibration.

Figures 1, 2:
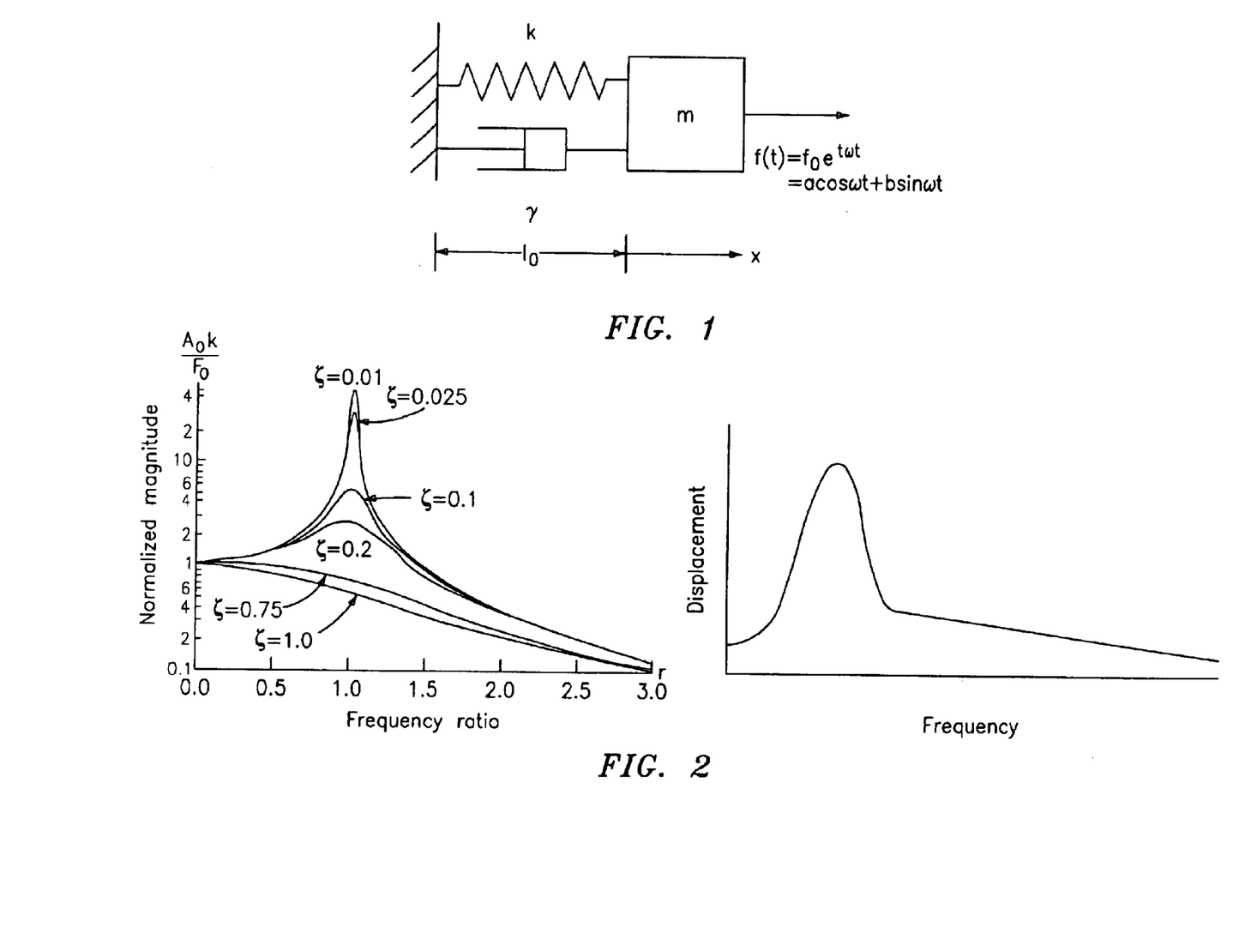
FIG. 1 A diagram of a mass experiencing forced vibration in a single degree of freedom.
FIG. 2 A graph of the Frequency Response Function (FRF) of a tool/workpiece/fixture system of the present invention.

With reference to FIG. 1, there is illustrated a mass experiencing a single degree of freedom under forced vibration excitation. The amplitude of motion depends upon both on the amplitude of the force and on the frequency of the force. A low frequency of excitation force causes a displacement determined by the familiar "static" stiffness (F=kx). As the excitation frequency increases, so does the amplitude of the displacement, up to the "resonance". At resonance, the frequency of the excitation force matches the natural frequency. At resonance, the amplitude of the displacement is much larger than at low frequency. For excitation frequencies higher than the natural frequency, the amplitude of the displacement decreases. The forced vibration, as seen in FIG. 2, is termed as a Frequency Response Function (FRF), where $\omega$ is the frequency of the exciting force and $\omega_n$ is the natural frequency of the system. As illustrated, the figure on the right is a plot of the displacement occurring at the natural frequency while the plot on the left illustrates the different levels of displacement given a level of excitation wherein the maximum displacement occurs at the natural frequency. The natural frequency is represented as:

$$\omega_n \sqrt{k/m},$$

Where k is the stiffness and m is the mass of the system.

In general, FIG. 2 shows that the Frequency Response Function (FRF) describes how a tool/workpiece/fixture system will vibrate in response to different frequencies of excitation. The FRF is a measurable function, and it can be used to compare and predict the performance of cutters and machine tools. There is a very high correlation between the FRF and the amount of speed and power that can be used in a milling operation.

Whereas "single degree of freedom" systems have 1 natural frequency, "multiple degree of freedom" systems have 1 natural frequency for each degree of freedom. Each natural frequency has a corresponding characteristic deformation pattern (mode shape). Vibration in "multiple degree of freedom" systems may be thought of as a sum of vibrations in the individual modes.

Figure 3:
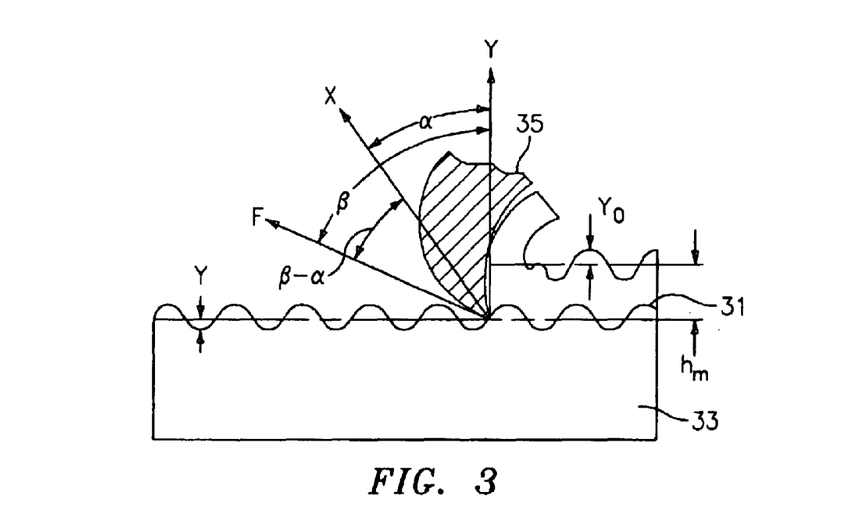
FIG. 3 A diagram of the effect of forced vibration on a workpiece surface.

With reference to FIG. 3, there is illustrated the wavy surface 31 produced on a workpiece 33 when a milling cutter or tool 35 makes a pass resulting from the tooth passing frequency. When a subsequent pass is made, the cutter 35 removes material from an existing wavy surface and at the same time leaves behind a new wavy surface. The regeneration of waviness causes a steady input of energy from the milling spindle drive into vibration at the cutting edge. The chip that is created by this cut carries both the waviness from the previous pass and that translated over by the current pass.

Figure 4:
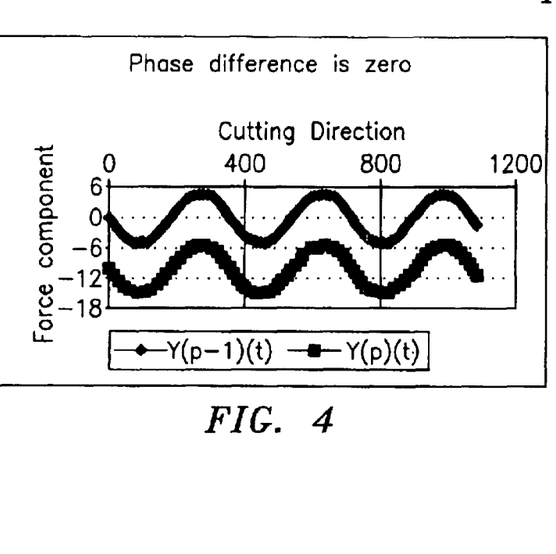
FIG. 4 A diagram of chip thickness generated by subsequent cuts which are in phase.
Figure 5:
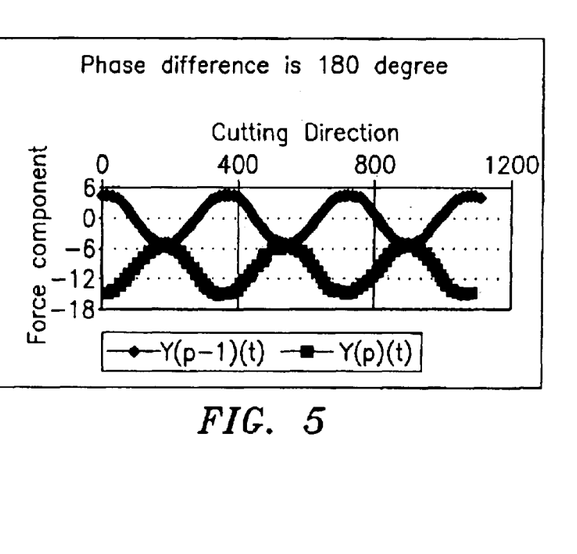
FIG. 5 A diagram of chip thickness generated by subsequent cuts which are 180 degrees out of phase.

If the new cut leads to a chip with constant thickness (i.e. the waviness of the chip is in phase), it creates a stable cut as illustrated in FIG. 4. If the waviness generates variable chip thickness (i.e. the waves are out of phase as illustrated in FIG. 5), this translates as variable forces on the cutting edge and eventually as vibration. This leads to the most undesirable vibrations in milling, specifically, self-excited chatter vibrations.

Chatter, the self-excited vibration between the workpiece 33 and the cutting tool, is another common problem during high speed machining and titanium. It significantly limits the machining productivity, adversely affects the surface quality, accelerates the premature failure of cutting tools, and damages the machine tool components. In general, it is observed that chatter cannot occur at the tooth passing frequency or any of its harmonics because there is no regeneration. This statement is correct if the tool is the most flexible part in the system. In high speed machining of titanium, the natural frequency of the workpiece and its system affect to a great extent the chatter generation condition.

A number of different strategies have been used to increase the stability, and thus productivity, of the machining system. These include increasing the rigidity and damping characteristics of the structure, selecting cutting conditions such as feed rate and spindle speed and the use of other schemes like Variable Speed Machining (VSM) wherein the nominal spindle speed varies continuously (typically along a sinusoidal trajectory) during machining.

For a given machine tool structure, the stability of the system can be enhanced by the proper selection of constant spindle speed using both off-line and on-line methods. In an effort to select cutting conditions that provide stable machining and high productivity, researchers have developed engineering tools commonly referred to as "stability charts". These charts generally show that as the spindle speed increases, wider speed intervals are developed within which relatively large depths of cut can be achieved while maintaining stability. This will increase the rate of metal removal. The stability of the system is obtained by repeatedly running the simulations at different combinations of spindle speed and depth of cut until the system becomes unstable.

Recently, a few analytical methods to predict the stability of Constant Spindle Speed Machining (CSM) have been developed. An iterative analytical stability model for determining the chatter stability for machining with a variable pitch cutter using constant spindle speed has been developed. In addition, in most reports, the machining chatter is modeled as a linear differential-difference equation with single regenerative effects. In reality, when chatter occurs, the amplitude of self-excited vibration increases until some non-linear effect limits any further increment. The stability analysis of linear models provides information only about the chatter threshold, but gives no information about the system behavior after the stability borderline has been exceeded. However, the information related to chatter after the stability borderline has been exceeded is of importance for the effective speed.

Aluminum is often machined in such a manner that the tooth passing frequency is equal to the natural frequency of the cutting tool. Cutting at the natural frequency of the tool indicates that the phase shift between the periodic excitation acting on the machine system due to the tooth passing frequency and displacement history of the machine-tool-work is equal to zero. This minimizes the magnitude of the real part of the system transfer function.

It is therefore possible to successfully utilize the above-mentioned technology for determining the optimum cutting speed for high speed machining of aluminum. However, it is difficult to apply the same technology for high speed machining of titanium alloy. The predicted stable depth of cut is too small to be used in practical cases. The dynamic force components in the case of machining titanium is about 30% of that generated during the machining of steel alloy or aluminum. Therefore, keeping the phase difference at zero degrees does not have a great effect on the amplitude of the undulation that is generated on the surface.

In addition, the use of active control technology is becoming more and more a routine application for aircraft systems. Active control schemes for vibration have long been studied, including fixed-frame swashplate control (higher harmonic control), rotating frame blade control (individual blade control, active flap control, active blade twist control), active transmission isolation (active transmission mounts, active control of structural response (ACSR)), and so on. Active control technology is also resident in other systems on the aircraft, for example flight controls, and is becoming more robust and expansive in functionality due to improvements and proliferation of digital capabilities throughout the aircraft system.

Much of the basic system dynamics and control strategies, in a generic sense, are applicable to the manufacturing process as well. There are many limitations in the manufacturing process today, whether cutting speed, depth, feed, etc., that arise due to dynamic constraints as noted above. Specifically, the cutting tool and the part to be cut are both dynamic systems. Further, during the cutting process, these systems exhibit changing dynamic characteristics. In whole, this coupled dynamic system exhibits resonances and modes that must be avoided to yield adequate quality in the resultant part. There is therefore needed a method of applying some of the basic tenants of active control to augment the manufacturing process and yield improved quality parts in less time and at less cost.

Such a methodology would ideally be approached via several levels of complexity with associated levels of productivity increase. Historically, the task has been one of "go as fast as you can" until the quality begins to degrade, then back off a bit to keep the quality adequate. This process, obviously, is ad hoc, and precludes the identification of optimum operating regimes.

It would be preferable if a methodology were to be employed which could account for the changing dynamics of the tool and part as the cutting operation progresses. What is therefore needed is a simple systematic technique to define the stable high cutting speed in machining titanium and which takes into account the changing dynamics of the tool and part as the cutting operation progresses.

SUMMARY OF THE INVENTION

Accordingly, it is an object of the present invention to provide a method for the systematic prediction of stable high speed cutting parameters for machining titanium.

In accordance with the present invention, a method of predicting the cutting speed for machining of titanium alloy comprises the steps of obtaining a first transfer function for a tool system, obtaining a second transfer function for a workpiece system, selecting from the first transfer function a first flexible mode, selecting from the second transfer function a second flexible mode, defining a natural frequency of the first flexible mode and the second flexible mode, calculating a tooth passing frequency using the defined natural frequency, accepting the calculated tooth passing frequency if the calculated tooth passing frequency differs from a second harmonic of a combined system formed of the tool system and the workpiece system and from at least one natural frequency corresponding to the tool system and the workpiece system, calculating a stable spindle speed, defining a cut depth using the calculated spindle speed.

Alternatively, in accordance with the present invention, a method is provided whereby dynamic characterization followed by addition of sensors and actuating elements to control part and/or tool dynamics via a closed feedback processing system yield freedom to select speed, feed and cutting depth to optimize tool use and part manufacturing and avoid the need to work around tool and part dynamic constraints.

DETAILED DESCRIPTION OF THE PREFERRED EMBODIMENT(S)

This present invention discloses an approach for predicting the cutting speed for high speed machining (HSM) of titanium alloy and, furthermore, for measuring and taking into account the changing dynamics of the machining tool and part as the cutting operation progresses. To form the prediction, there is utilized an understanding of both the physics and the tool/workpiece/fixture system dynamic behavior when it is exposed to forced vibration. Such a prediction provides higher machining rates than empirically derived values.

The present invention stems, in part, from the following realization regarding the dynamic behavior of the tool/workpiece/fixture system: For conventional machining of titanium alloys, the tooth passing frequency will not be able to excite the machining system. On the other hand, for a cutting speed of 10 times the conventional one, the tooth passing frequency is usually in the range of 60 to 500 Hz. In such an instance, the tooth passing frequency can excite and vibrate the workpiece and the fixture in addition to the tool.

As a result, it is evident that the dynamic characterization for the workpiece and the fixture is very important for high speed machining of titanium alloys.

Figure 6:
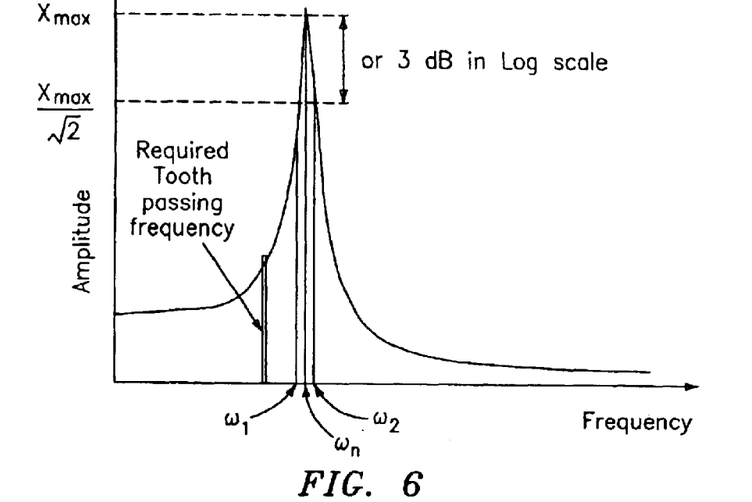
FIG. 6 A graph illustrating the effect of changing the tooth passing frequency on the vibration amplitude.

A resonance condition is generated when the spindle speed, chosen for machining titanium is such that the natural frequency of one of the tool/workpiece/fixture modes is equal to the tooth passing frequency as illustrated in FIG. 6. The generation in such a case inhibits the development of forced vibration and the phase shift between the periodic excitation acting on the machine system due to the tooth passing frequency and displacement history of the machine-tool-work is equal to zero. Hence, the self-excited vibration does not occur. As the spindle speed is decreased and more than one cycle of vibration occurs between tool passes, the above-mentioned phase angle φ increases. The phase angle relation can be represented as follows:

$$\phi = \left(\frac{\omega}{\omega_n} - 1\right) * 360°$$

Where ω is the tooth passing frequency *2 and $\omega_n$ is the natural frequency of the most flexible component in the system *2π. Utilizing this equation, the tooth passing frequency can be determined as a function of the phase shift angle φ.

The constraints for defining the phase shift angle is determined based on the dynamic behavior of the tool/workpiece/fixture and the amplitude of energy generated or dissipated in the system. To define the required phase shift angle, the work done by the exciting force over one cycle of tool/workpiece/fixture vibration may be calculated as $$Work = \int_0^{2\pi/\omega} f(t) \frac{x(t)}{dt} dt$$

The instantaneous exciting force f(t) is a function of the instantaneous chip thickness, the width of cut, and the specific cutting force K. Substituting the instantaneous exciting force by the product of the variable chip thickness, K, and width, the results of the integration will be as follows:

$$\begin{aligned} Work \; \alpha \; K \; x_0^2 \sin\phi = \; & 0 & \phi = 0 \\ & -Kx_0^2 & \phi = 90 \\ & 0 & \phi = 180 \\ & Kx_0^2 & \phi = 270 \end{aligned}$$

The integration of the work indicates that when the phase angle φ is equal to 0° or 180°, the excitation force does not introduce energy or dissipate energy from the tool/workpiece/fixture system. On the other hand, when φ is 90°, the excitation force dissipates energy from the system as indicated by the negative signal and stabilizes the regenerative mechanism. As for when φ is 270°, the excitation force induces energy in the system as indicated by the positive sign and destabilizes the regenerative mechanism.

As FIG. 4 illustrates, when regeneration occurs within a zero degree phase shift angle there is no variation in the instantaneous chip load and exciting forces and consequently no energy change in the machining system per one cycle. Since the tool is not expected to loose contact with the workpiece, the possibility of chatter occurring is minimum. However, the amplitude of the generated waviness due to forced vibration with an exciting frequency (tooth passing frequency) equal to the natural frequency of the system can be very high leading to a dynamic component of cutting force and tool chipping.

FIG. 5 illustrates that when regeneration occurs with a 180 degree phase shift angle, large variation in the instantaneous chip load and exciting forces occur but, based on the predicted work, no energy change in the machining system per one cycle is encountered. Since the tool can easily loose contact with the workpiece, the possibility of chatter occurring is maximum. The amplitude of the tool/workpiece/fixture vibration will not grow exponentially since there is no energy change per cycle. However, the vibration amplitude will be high in a large part of the cycle due to the increase in the exciting force. This can cause chipping of the tool during high speed machining of titanium.

Figure 7:
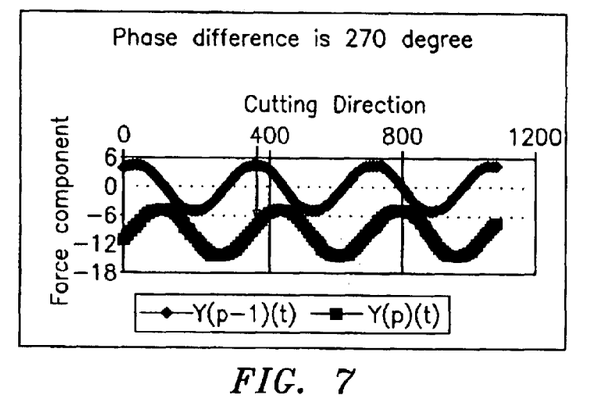
FIG. 7 A diagram of chip thickness generated by subsequent cuts which are 270 degrees out of phase.

FIG. 7 illustrates that when regeneration occurs with a 270 degree phase shift angle, the instantaneous chip load and exciting forces vary considerably during the cut. It is further illustrated that the maximum exciting force occurs within the region where the tool/workpiece/fixture displacement trajectory acts in the same direction as the exciting force, which induces energy in the machining system per one cycle. Since the maximum exciting force coincides with the direction of the system displacement, the vibration amplitude grows to a large value. However, exceptional growth of the vibration amplitude that will lead to chatter does not occur since the chip load approaches zero at a certain part of the cycle. Therefore, the system stability during the high speed machining of titanium can not be insured at a spindle speed that generates a 270 degree phase shift angle between the successive displacement trajectories of the tool/workpiece/fixture.

Figure 8:
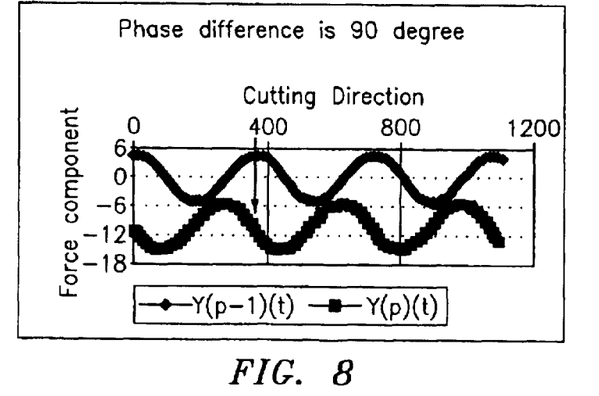
FIG. 8 A diagram of chip thickness generated by subsequent cuts which are 90 degrees out of phase.

With reference to FIG. 8 it is illustrated that when regeneration occurs with a 90 degrees phase shift angle, the instantaneous chip load and exciting forces vary considerably during the cut. It is further illustrated that the maximum exciting force occurs within the region where the tool/workpiece/fixture system displacement trajectory acts in the opposite direction as the exciting force, which dissipates energy from the machining system per one cycle. Since the maximum exciting force opposes the direction of the system displacement, the vibration amplitude diminishes to a low value and exponential growth of the vibration amplitude that will lead to chatter does not occur as the chip load approaches zero at a certain part of the cycle. The system stability during the high speed machining of titanium is therefore experienced at a spindle speed that generates a 90-degrees phase shift angle between the successive displacement trajectories of the tool/workpiece/fixture.

The above discussion shows that the generation of a phase of 90 degree between the natural frequency of the most flexible component of the tool/workpiece/fixture system and the tooth passing frequency will allow for high speed machining of titanium alloys in stable regime. Tool chipping due to forced vibration is minimized or eliminated.

A preferred methodology for defining the spindle speed for stable high speed machining of titanium alloys is as follows:

1. Obtain a transfer function for the tool/holder/spindle system using hammer impact testing in both X-Y planes. When conducting hammer impact testing, a hammer is manipulated to produce vibrations in the tool/holder/spindle system.
2. Obtain transfer functions for the workpiece/fixture system using hammer impact testing in the X-Y-Z planes.
3. Examine both transfer functions to define the most flexible modes for both systems. As used herein "most flexible mode" refers to the natural frequency, under 500 hz, with the greatest "real" value.
4. Define the natural frequency of the flexible component of the workpiece/fixture system or the tool/holder/spindle system.
5. Calculate a predicted tooth passing frequency that will generate a low level of vibration during machining as follows:

$$f_{tooth\ passing\ frequency} = \frac{f_n}{n + 0.25}$$

where n is an integer number 1, 2, 3, 4, . . . , which can be used to move to a slower speed range defined by the application.
6. Examine the predicted tooth passing frequency and the second harmonic with the natural frequencies of the different system components. The predicted tooth passing frequency should not coincide with any of these frequencies.
7. Calculate the stable spindle speed from the following equation.

$$N_{spindle} = \frac{f_n}{n + 0.25} * 60 / N_{number\ of\ teeth}$$

8. Calculate how deeply one can cut in titanium as follows: Axial depth of cut $=1/(2\ k\ N_{average\ no.\ of\ teeth\ that\ are\ in\ cut}\ R_e[G]_{min})$ where k is the specific cutting force or titanium ~280,000 lb/in$^2$, and $R_e[G]_{min}$ represents the minimum value of the real part of the transfer function of the flexible mode.

In the case of side milling with a large L/D ratio, where L equals the length of the cutter and D equals the diameter of the cutter. the dynamic modes of the flexible part in the three coordinates XYZ should be considered in deciding upon the tooth passing frequency.
9. Lastly, a database for different parts may be generated within which is stored the optimal spindle speed and milling depth appropriate for each part. This data may be retrieved and utilized as appropriate when commencing to machine one such part.

Figure 9:
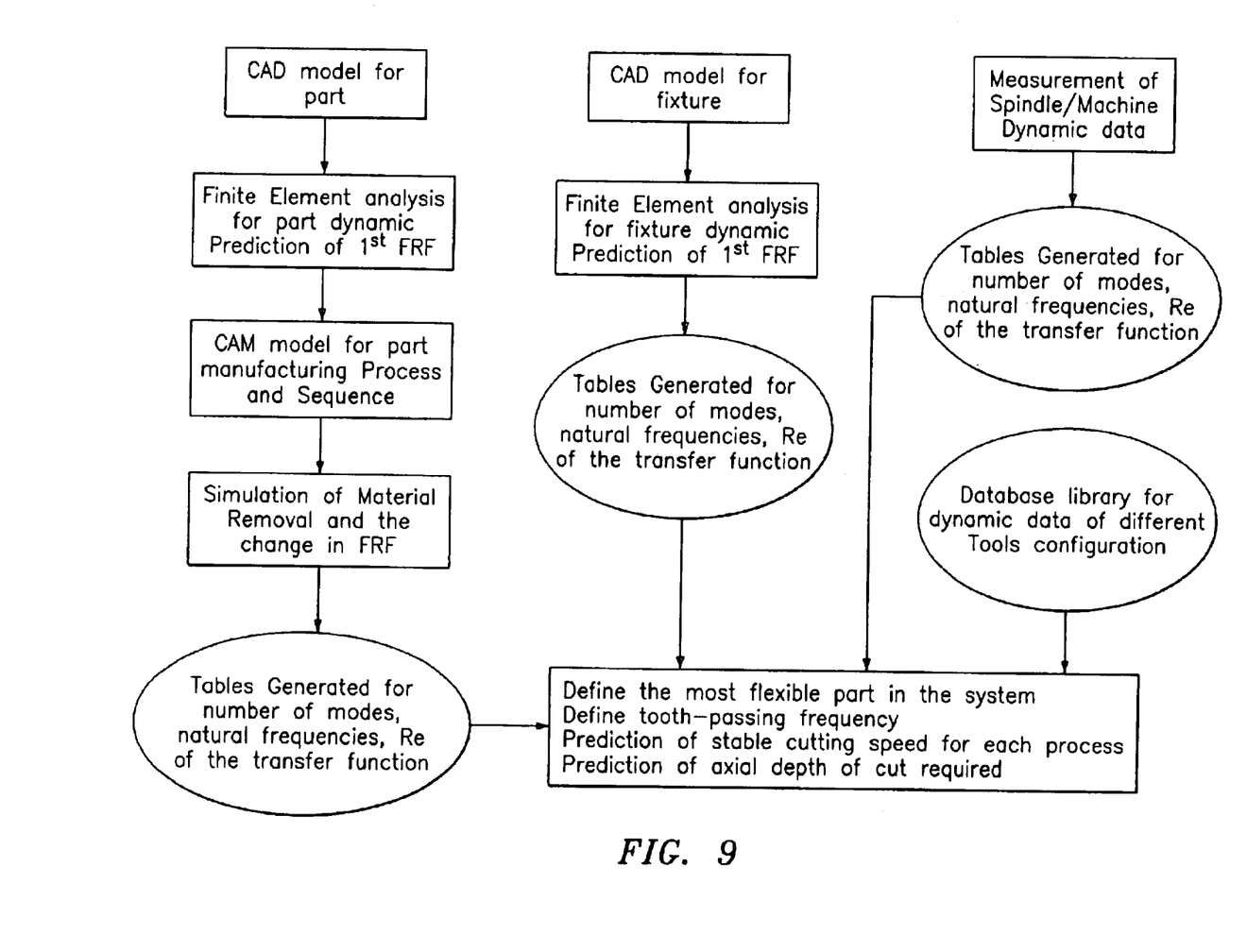
FIG. 9 is an embodiment in which a CAD model is used.

In addition to physically manipulating the tool/holder/spindle system and the workpiece/fixture system through a process of hammer impact testing or the like, it is possible to model both systems in a computer and to deduce through a process of computer simulation the transfer functions, number of modes, and natural frequencies of each system as illustrated with reference to FIG. 9. Specifically, a Computer Aided Design (CAD) model of the workpiece/fixture system can be generated. Finite element analysis can then be performed upon the CAD model to form a dynamic prediction of the first frequency response function of the system. In addition, a computer aided machining (CAM) model can be constructed which details the manufacturing processes and the sequence in which the processes are to be performed for the workpiece/fixture. Using the CAM model, it is further possible to simulate the change in the FRF of the system resulting from the removal of material occurring as the result of machining. As a result of the simulation, tables can be generated specifying the number of modes and natural frequencies corresponding to the computed transfer function.

Similarly, a CAD model of the tool/holder/spindle system can be generated. Finite element analysis can then be performed upon the CAD model to form a dynamic prediction of the first frequency response function of the system.

As a result of the analysis, tables can be generated specifying the number of modes and natural frequencies corresponding to the computed transfer function.

The combined tables generated for both systems as noted above can then be combined to define the most flexible part of the system, to define the tooth-passing frequency, to predict the stable cutting speed for each process, and to predict the axial depth of the cut required.

In addition, in a preferred embodiment, instrumentation is attached to the cutting tool and/or the part to acquire transient dynamic data of the coupled system (during the cutting operation). In this manner, it is possible to account for the changing dynamics of the tool and/or the part as the cutting operation progresses. Such a scheme automates the "optimal" operation parameters and varies them over time to adapt to the changing dynamics of the system.

Figure 10:
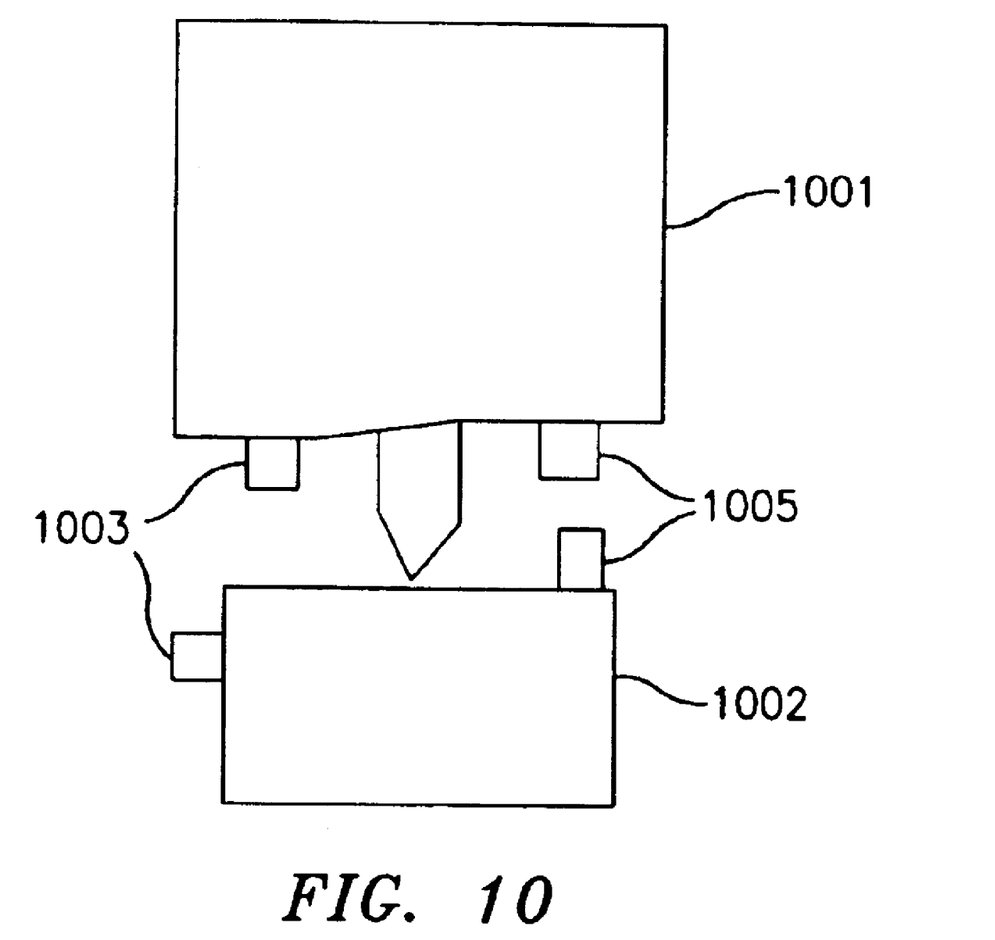
FIG. 10 is a system used to acquire transient dynamic data.

Such a configuration is illustrated with reference to FIG. 10. In the preferred embodiment illustrated, sensors 1003 and actuators 1005 are attached to part 1002 and cutting tool 1001. By actuating either or both components 1001, 1002, an amount of control can be imparted on the transient dynamic characteristics of either or both during the cutting operation. In the limit, this system can adaptively alter the coupled dynamic system so as to transiently impact modal resonances and response in a way to totally free up the manufacturing parameters. Thus, speed, feed, depth, etc., can be chosen based on part quality and maximum efficiency of a given operation, and no longer suffer from system dynamics constraints.

It is apparent that there has been provided in accordance with the present invention a method for the systematic prediction of stable high speed cutting parameters for machining titanium which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of predicting the cutting speed for machining of titanium alloy comprising the steps of:

obtaining a first transfer function for a tool system;

obtaining a second transfer function for a workpiece system;

selecting from said first transfer function a first flexible mode;

selecting from said second transfer function a second flexible mode;

defining a natural frequency of said first flexible mode and said second flexible mode;

calculating a tooth passing frequency using said defined natural frequency;

accepting said calculated tooth passing frequency if said calculated tooth passing frequency differs from a second harmonic of a combined system formed of said tool system and said workpiece system and from at least one natural frequency corresponding to said tool system and said workpiece system;

calculating a stable spindle speed;

defining a cut depth using said calculated spindle speed.

2. The method of claim 1 wherein said obtaining said first transfer function comprises the additional step of performing hammer impact testing in an X and Y plane.

3. The method of claim 1 wherein said obtaining said second transfer function comprises the additional step of performing hammer impact testing in an X, a Y, and a Z plane.

4. The method of claim 1 wherein said tooth passing frequency equals said natural frequency of said first flexible mode and said second flexible mode divided by (n+0.25) wherein n is an integer number.

5. The method of claim 1 wherein said stable spindle speed equals ((said tooth passing frequency)*60/N) where N equals a number of teeth.

6. The method of claim 1 wherein said cut depth equals $1/(2kN'R_e[G]_{min})$ wherein k is the specific cutting force for titanium, $R_e[G]_{min}$ is a minimum value of a real part of said first or said second transfer function, and N' is an average number of teeth that are in a cut.

7. The method of claim 1 wherein obtaining said second transfer function comprises the additional steps of:

creating a CAD model for said workpiece system;

performing finite element analysis to compute a frequency response function;

creating a CAM model of said workpiece system defining at least one process step to be performed on said workpiece system; and simulating a removal of material in accordance with said at least one process step to compute an updated frequency response function and said second transfer function.

8. The method of claim 1 wherein obtaining said first transfer function comprises the additional steps of:

creating a CAD model for said tool system;

performing finite element analysis to compute a frequency response function; and generating said first transfer function from said frequency response function.

9. The method of claim 1 comprising the additional steps of attaching actuators or sensors to said workpiece system and said tool system and adaptively altering a coupled dynamic system comprising said workpiece system and said tool system so as to transiently impact a plurality of modal resonances and responses.

* * * * *